April 17, 1934.     R. TORGERSEN     1,955,476
FLOWER BOX HOLDER
Filed March 25, 1932
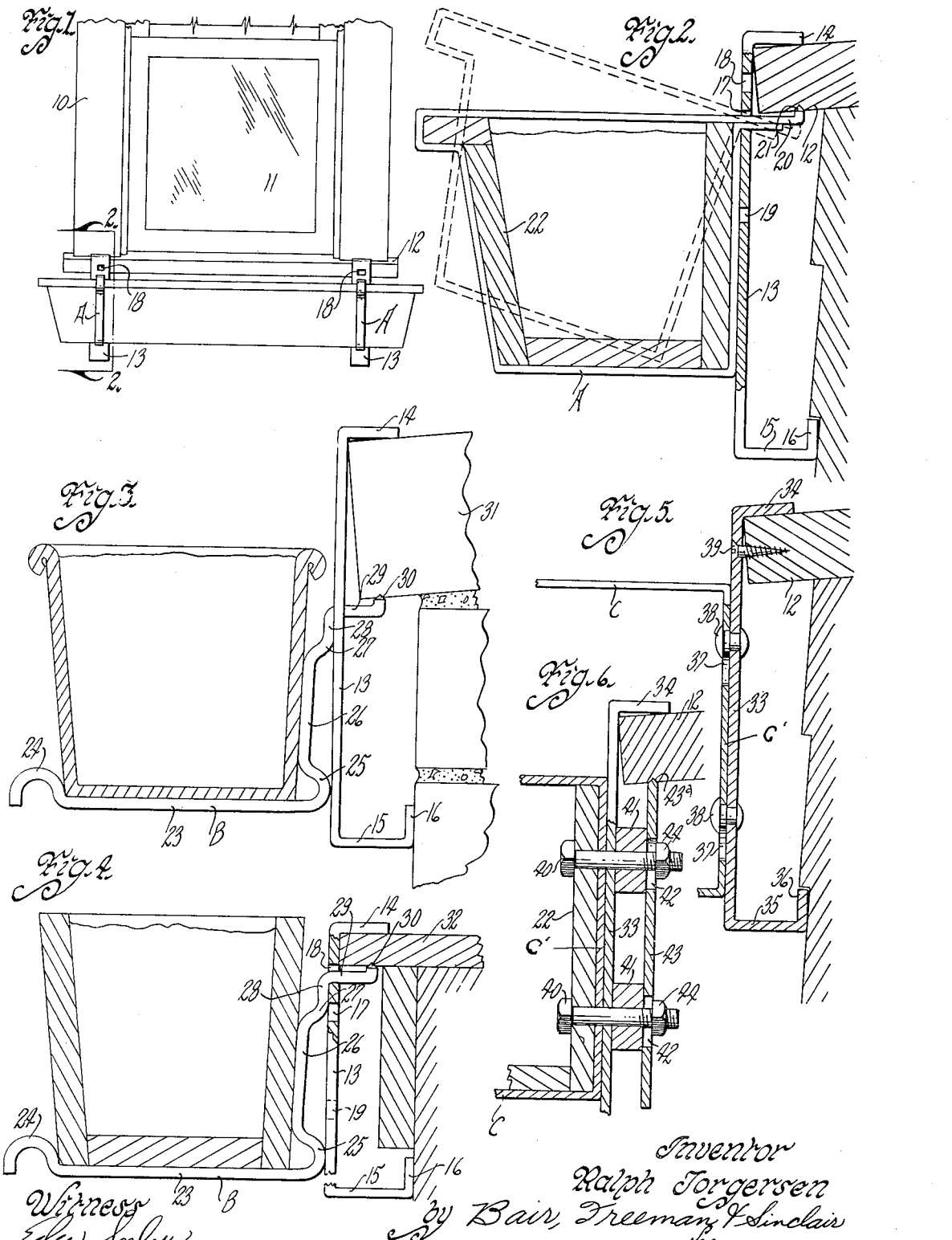

Patented Apr. 17, 1934

1,955,476

UNITED STATES PATENT OFFICE 1,955,476

FLOWER BOX HOLDER

Ralph Torgersen, Des Moines, Iowa

Application March 25, 1932, Serial No. 601,159

2 Claims. (Cl. 248—20)

The object of my invention is to provide a flower box holder of very simple, inexpensive and durable construction which can be readily and easily mounted on a window sill or the like without the use of special tools.

With this and other objects in view my invention consists in the construction, arrangement and combination of the various parts of my device, whereby the objects contemplated are attained, as hereinafter more fully set forth, pointed out in my claims and illustrated in the accompanying drawing; in which:

Figure 1 is a front elevation of a portion of a building wall having one of my flower box holders installed thereon and supporting the flower box.

Figure 2 is a detail, sectional view taken on the line 2—2 of Figure 1.

Figure 3 is a view similar to that of Figure 2 illustrating another form of my holder.

Figure 4 is a view similar to that of Figure 3 showing the holder installed on the inside of the house.

Figure 5 is a similar view to that of Figure 2 illustrating another form of my holder; and Figure 6 is a similar view illustrating still another form of holder.

It is desirable to provide a flower box holder which can be conveniently, easily and quickly installed for holding a window flower box or the like. I have provided such a holder which, as shown in the drawing, may be made in a considerable variety of forms, all of which, I believe, embody the principle of my invention.

On the drawing herewith, I have shown the building 10 having the window 11 with a sill 12, of the ordinary wood type. In the form of my invention illustrated in Figures 1 and 2 the holder is made in two parts, which for convenience I will call a support and a hanger. The support 13 comprises an upright member, which may be made of a bar of metal or any suitable material, having at its upper end a right-angled extension 14 and at its lower end a similar extension 15, preferably somewhat longer, and arranged parallel with the extension 14 and terminated in an upwardly extending part 16. The upright supporting member 13 has near its upper end a hole 17 and may have additional vertically spaced holes 18 and 19. Preferably two of these complete holders are used for each flower box.

The support 13 is arranged with its upper extension 14 resting upon the sill 12 and with its extension 16 resting against the wall of the building 10, as perhaps best shown in Figure 2. The hanger indicated at A may be made in the form of a strap or the like of metal shaped to fit around the flower box and having at one upper corner a laterally projecting member 20 terminating in a sharp upward extension 21.

The hanger A is slipped over the box 22, which may be of any desired shape, size or material. When two of these hangers have been installed on a box, the box, with the hangers thereon, is then lifted upwardly and the members 20 are inserted through the holes 17 of two of the supports 13 with the parts tilted upwardly as illustrated in dotted lines in Figure 2. Then the box is permitted to drop down until it hangs against the supports 13 as illustrated. The weight of the box will cause the hangers and supports to serve as clamps to grip the sill and thus hold the flower box holder and the box rigidly supported in place.

If it is desired to remove the box it may be slid endwise from the hangers or together with the hangers it may be tilted upwardly to the dotted line position of Figure 2 whereupon members 21 will disengage the underside of the sill and the members 20 and 21 may be withdrawn through holes 17. Thereupon it is obvious that the support 13 may be removed from the sill.

In order to make my holder adaptable to a variety of installations, I have arranged the holes 17 at the proper distances from the extensions 14 for proper installation of the holders on ordinary wood sills. I preferably also provide the holders 13 with the holes 19 so that if desired the members 20 may be inserted through those holes for installing the holders on a brick sill. Likewise I have provided the holders 13 with the holes 18 for convenience in installing the holders inside a building supported on the stool of a window frame.

In Figures 3 and 4 I have shown installations on brick sills and the stool respectively. The holders in these figures, however, have slightly modified forms of hangers B. In the installation in Figure 3, for example, the holder 13 is similar to that already described. The hanger B, however, comprises a base bar or the like 23 which has at one end an upwardly projecting, downwardly opening portion 24 which may have somewhat the shape of a part of a circle.

At the other end of the member 23 it is bent upwardly and then inwardly as indicated at 25, thence virtually upwardly as at 26, thence outwardly again as at 27, thence upwardly as at 28 and thence inwardly as at 29, to terminate in an upwardly projecting sharpened portion 30. The portions 28 and 25 serve to engage the holder 13 as shown, and the portions 23, 24 and 26 engage the flower box.

Where the form of hanger illustrated in Figures 3 and 4 is employed the portion 29 of the hanger is inserted through the hole 19 of the support for installation on a brick wall 31 or through the hole 18 for installation on a stool 32.

Referring to the form of the holder shown in Figure 5 it will be noted that it has a support comprising a member 33 which is substantially upright in installed position. At the upper end of the member 33 is an extension 34 adapted to rest on the upper surface of the sill as in the case of the member 14 already referred to. At the lower end of the member 33 is an extension 35 similar to the extension 15 terminating in an upright member 36 similar to the member 16.

For coacting with the support just described, I provide a hanger C in the form of a band or the like of strap iron or other suitable material arranged to fit around a flower box as in the case of the hanger A. The upright portion C' of the hanger C is designed to rest against the member 33 and is provided with suitable vertically spaced key-hole slots 37, with the enlarged portions at their lower parts. Headed rivets 38 are mounted on the member 33 and arranged to afford engaging means by which the hanger C can be hung on the member 33.

In Figure 6 I have shown still another form of my invention having the support holder with the member 33 and extension 34 and other parts as illustrated in Figure 5 and already described. The hanger C is the same as that described above. However, instead of using the headed rivets 38 and the key-hole slots as means for associating the hanger and the support together in the complete installation, I have extended through the member 33 the bolts 40. A screw 39 is used for fastening the member 33 to the sill 12. Bolts 40 are extended through the wall of the box 22 and through the member C' of the hanger C, then through the member 33 and then through filler blocks 41, thence through vertically elongated slots 42 in a clamping plate 43.

The upper edge of the clamping plate or bar 43 may be slightly sharpened as at 43a and is intended to engage the under-surface of the sill 21.

On account of the elongation of the slots 42, the plate 43 may be readily adjusted to clamping position and the nuts 44 may then be fastened in place.

Changes may be made in the details of the construction and arrangement of my improved flower box holder and it is obvious from the foregoing that my invention may be embodied in a considerable variety of forms. It is therefore my purpose to cover by my claims any modifications or uses of mechanical equivalents or variations in the arrangement of structures or parts or materials employed which may be reasonably included within their scope.

While I have described my invention as a flower box holder, it will be understood that a device of this kind could be used for holding other containers, such for instance as feed boxes, and it is my purpose to cover the device for holding any sort of container for which it may be adapted.

I claim as my invention:

1. In a device of the kind described, a holder having portions projecting laterally at its ends, one above the other, and an intermediate portion and a hanger cooperatingly associated with the holder for coacting with the holder at the upper and lower portions thereof for being held in operative position, said device having an adjustable part for cooperating with one of said laterally projecting ends for gripping a support.

2. In a device of the class described, the combination of a holder having an upright intermediate portion, a laterally projecting portion at its upper end adapted to overhang a projecting part of a building or other support and having a laterally projecting portion spaced below said first portion adapted to engage the face of the building or other support for holding the device upright, with a hanger having a portion forming a clamping part slidably extended through the upright portion of the support and adapted to coact with the upper extension on the support for engaging the projecting part of the building or the like with a gripping action, said hanger having a downwardly extending portion adapted to engage the upright portion of the support when the device is installed and having means for holding a flower box or the like.

RALPH TORGERSEN.